US012803988B2

(12) United States Patent
Saraf

(10) Patent No.: US 12,803,988 B2
(45) Date of Patent: Nov. 17, 2026

(54) HUMAN AND NON-HUMAN IDENTITY RISK EXPOSURE ANALYSIS

(71) Applicant: Microsoft Technology Licensing, LLC, Redmond, WA (US)

(72) Inventor: Pushkar Saraf, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/940,436

(22) Filed: Nov. 7, 2024

(65) Prior Publication Data

US 2026/0129050 A1 May 7, 2026

(51) Int. Cl.
*H04L 9/40* (2022.01)

(52) U.S. Cl.
CPC .......... *H04L 63/105* (2013.01); *H04L 63/102* (2013.01); *H04L 63/1425* (2013.01)

(58) Field of Classification Search
CPC . H04L 63/105; H04L 63/102; H04L 63/1425; G06F 21/577; G06F 21/604; G06F 21/6218
See application file for complete search history.

(56) References Cited

U.S. PATENT DOCUMENTS

2012/0036583 A1* 2/2012 Kichikawa .......... G06F 21/6218 726/27
2019/0147152 A1* 5/2019 Kurian .................... G06F 21/32 382/118
2020/0267162 A1* 8/2020 Koottayi ................ G06F 21/50
2022/0345457 A1 10/2022 Jeffords et al.

OTHER PUBLICATIONS

International Search Report and Written Opinion received for PCT Application No. PCT/US2025/040408, mailed on Nov. 4, 2025, 14 pages.

* cited by examiner

*Primary Examiner* — Sangseok Park
(74) *Attorney, Agent, or Firm* — Newport IP, LLC; Jacob P. Rohwer

(57) ABSTRACT

Risk identification and management approaches are described. Real time risk identification and mitigation capabilities enable the provision and deprovision of access to various resources. This capability incorporates Just-In-Time (JIT) and Just-Enough-Access (JEA) elevations to adjust access permissions in real-time based on the risk landscape. In some embodiments, the risk landscape may include human and non-human users.

20 Claims, 5 Drawing Sheets

300

| Confidence | Risk-Score | Alert | Severity |
|---|---|---|---|
| Very Likely (> 0.85) | High (> 0.8) | Yes | Very Critical |
| | Medium (> 0.6) | Yes | Very Severe |
| | Low (< 0.6) | No | Safe |
| Likely (> 0.67) | High (> 0.8) | Yes | Critical |
| | Medium (> 0.6) | Yes | Severe |
| | Low (< 0.6) | No | Safe |
| Not Likely (< 0.67) | - | No | Safe |

HUMAN AND NON-HUMAN IDENTITY RISK EXPOSURE ANALYSIS

BACKGROUND

1. Field

This disclosure relates generally to distributed computing systems and identity risk management across organizations.

2. Background

Distributed computing systems employ a zero-trust model, presuming threats materialize from both internal and external sources. To combat such threats, the zero-trust model employs strict access controls and continuous verification. Multi-factor authentication and identity-based authentication policies are used to manage access across distributed components to ensure verified users and systems can interact with sensitive resources. AI and machine learning is used to identify patterns and preempt attacks in complex networks.

SUMMARY

A risk-scoring model that evaluates both human and non-human (e.g., computing devices, servers) identities are proposed herein. The disclosure provides a proactive framework specifically designed to preemptively identify and mitigate threats working in conjunction with authentication technologies such as secure token issuance (STI) and enterprise security token service (ESTS) to implement a risk-based access control system. This control system can be easily deployed throughout an entire enterprise, across multiple organizations and various teams. Additionally by embedding artificial intelligence and machine learning models directly into the process, the solution follows zero-trust principles in the goal of achieving least privileged access (LPA).

Distributed computing systems include various discrete hardware and software components that operate in conjunction to provide a variety of functionalities to clients of the distributed computing systems. Users may access various aspects within a distributed computing system according to the user's access levels and/or credentials.

Patterns and behaviors of users and entities are analyzed to identify abnormal and potentially dangerous behavior. Such pattern profiles are learned over time and across various peer groupings such as similarly situation teams within an organization. By analyzing behavior patterns and identifying risks, the identity risk exposure analysis system described herein can provide legitimate and authenticated identities with granted or elevated access when necessary. Any unusual activity can be quickly detected and addressed appropriately.

Anomalous behavior refers to unusual or unexpected activities undertaken by a user (either human or non-human) that deviates from established norms or baseline behavior within a network or system. Identification of these types of unusual activities leads to detection of potential security threats because such anomalous behaviors may signal suspicious or malicious activity. The methods and systems described herein monitor network activity to identify suspicious anomalous behavior that diverge from expected patterns of usage which may potentially signal unauthorized access, malicious activity, or security vulnerabilities. Constant, real-time monitoring may be achieved by implanting machine learning and behavioral analytics to establish a baseline by reviewing historical data and real-time data to flag deviations (anomalous behaviors or activities) for investigation.

Examples of anomalous behaviors may include but are not limited to: multiple concurrent elevation requests (e.g., sending several requests for elevated access within the same minute), submission of elevation requests outside of a typical working schedule of a user (e.g., at 4 am), submission of elevation requests to access resources that is outside of the scope of the responsibilities associated with the user (e.g., an engineer requesting access to HR payroll tools), installation or execution of a new or unusual process that is not part of typical operations, large data transfers, and high network traffic from a single IP address. Other anomalous behaviors are expected to occur yet are too numerous to list. The scope of this disclosure is understood to encompass all types of unwanted, unexpected, and undesirable behaviors that may impact the security of the computing system.

The following is a non-exhaustive listing of some aspects of the present techniques. These and other aspects are described in the following disclosure.

Some aspects include application of a human and non-human identity risk exposure analysis. The analysis may provide recommendations for adjusting various access levels enjoyed by humans and non-humans to resources within an organization. The analysis may also be programmed to take autonomous and/or preventative measures without human interference.

A method for providing human and non-human identity risk exposure analysis may include receiving, by a processor, from a device of a first user, a request for elevated access to a resource; detecting, by the processor, an instance of an anomalous behavior caused by the first user; based at least in part on the anomalous behavior, assigning, by the processor, a risk score to the first user; providing, by the processor, to a device of a second user, the received request for elevated access to the resource, and a notification indicating the instance of the anomalous behavior; receiving, by the processor, an indication granting the request for elevated access to the resource; and adjusting, by the processor, an access level of the first user to the resource in accordance with the granted request.

Some aspects include a tangible, non-transitory, machine-readable medium storing instructions that when executed by a data processing apparatus cause the data processing apparatus to perform operations including the above-mentioned application.

Some aspects include a system, including: one or more processors; and memory storing instructions that when executed by the processors cause the processors to effectuate operations of the above-mentioned application.

Even though cybersecurity applications are described in several examples, the described techniques have a wide range of applications where available data sources are vast, and have different storage architectures, query languages, or other characteristics.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
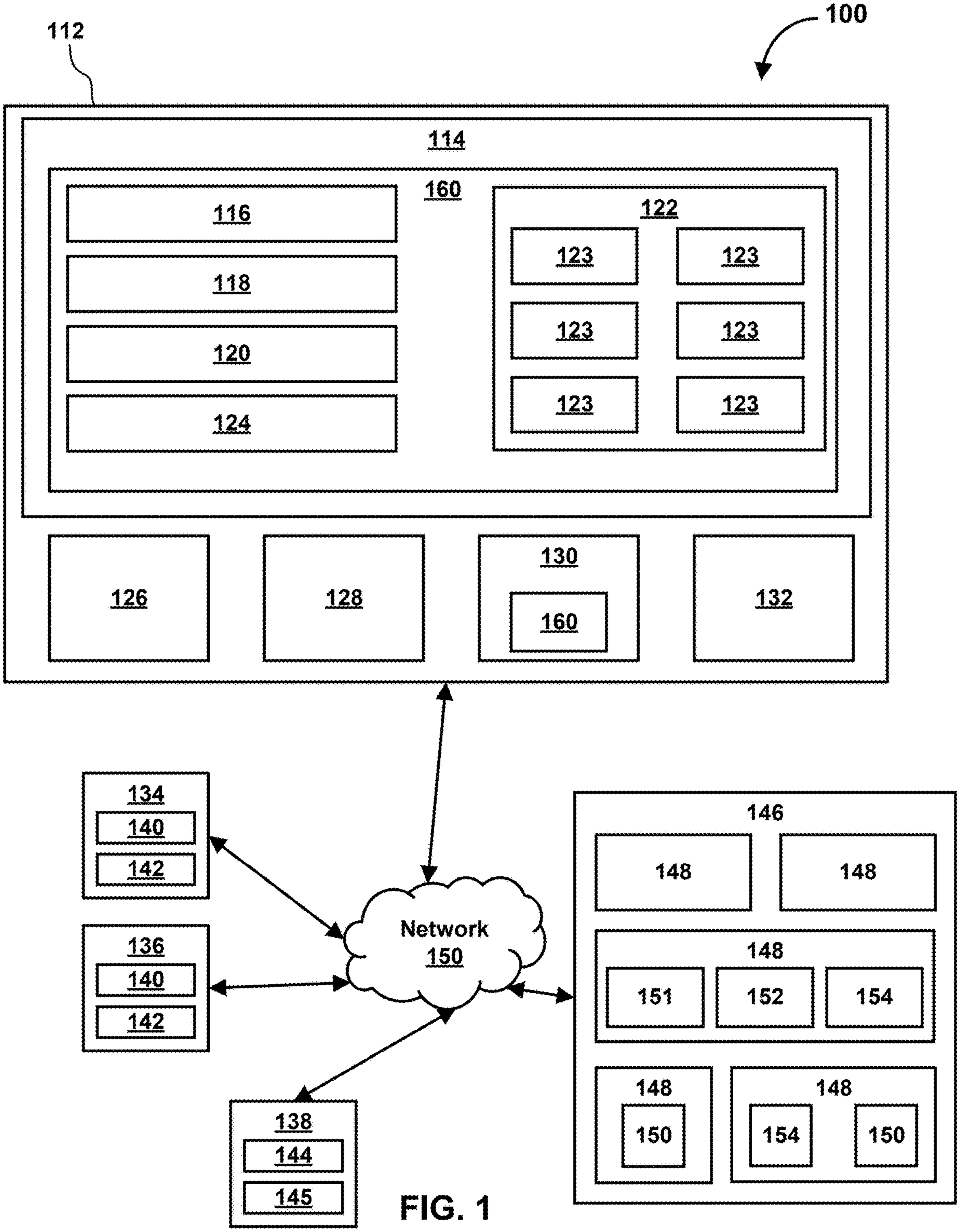
FIG. 1 is an example illustration of a distributed computing system configured to implement one or more embodiments described within the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

Security systems for distributed computing networks have adopted Just-In-Time (JIT) and Just-Enough Access (JEA) mechanisms. These solutions aim to reduce risks posed by standing access privileges, particularly in the event of compromised credentials. These solutions that grant elevated privileges enhance security of the organization by minimizing attack surfaces. Still, the solutions have several limitations including lacking predictive analytic capabilities, behavioral analytics, and real-time adjustments to access permissions.

Typically, various users receive varying levels of access to resources within an organization. Resources include digital assets, services, data, applications, programs, or tools that can be utilized by a user. For example, an organization may include a resource for information technology (IT), a resource for payroll, and a resource for compliance. These resources may have specific access configurations based on the sensitivity of the information stored or accessed within said resource. Each resource may include various access levels to define what actions a user can perform. Access levels may include varying degrees of reading, writing, modifying, and executing capabilities granted to a user. The access levels may correspond to roles, groups, seniority, security levels, necessity, or other metric. The users may initiate access to resources by self-identifying to authenticate him/herself. Next, he/she may submit a request to access a resource and the request is reviewed by a supervisor or management personnel. A request is an action initiated by either human or non-human users to access a resource typically for accessing data, modifying configurations, and reviewing files. In some embodiments, the request is for elevation of access (e.g., to obtain elevated access), meaning the user is able to access details, functionalities, files, or other data of a resource it was previously not privy to access. In other words, the user is granted more permissions to perform actions or access resources beyond the previous or usual authorization level. The request may be approved, denied, or pending further review. In instances where the request is approved, the user will be permitted to access the resource and/or parts of the resource that correspond to the approved access level.

This known method of requesting and reviewing access requests may become cumbersome and lacks the flexibility needed to maintain a secure system. In a large organization, it becomes difficult to track which user is entitled to access a specific resource and to what extent. Additionally, if a user becomes compromised, well-known methods are unable to respond in a timely manner.

By evaluating both human and non-human identities using the risk identification analysis model described herein, threats are preemptively detected in a framework that integrates well with existing technologies (e.g., JIT/JEA systems). A machine learning model or artificial intelligence (AI) may be used to supplement the risk identification analysis model to learn and predict when risks may occur. Such machine learning models or AI are advanced software systems designed to analyze vast amounts of data generated across distributed components to identify patterns, detect anomalies, make predictions, and perform actions based on the predictions. These models operate across multiple nodes in the network to process data in real-time. They adapt to evolving risks by learning from both historical and live data, making them an integral part of proactive threat detection and the risk identification analysis model as a whole. This integration will allow the system to become robust in in handling risks appropriately—with or without human intervention. The risk of misuse of entitlement (access privileges) will be reduced as well as improving the dynamic access control within the network.

To mitigate the problems described herein, the described risk identification model provides a timely and nimble technical solution to address the granting and denying of access privileges that may incur potential security risks. Instead of granting access privileges once and leaving it unchanged, the system continuously monitors and evaluates access privileges to ensure that the appropriate users have the appropriate level of access. This level of monitoring allows for substantially immediate, real-time (e.g., within milliseconds of occurrence) access privilege adjustments to be made to minimize the available attack surface by bad actors.

FIG. 1 illustrates an example computing system 100 comprising a computing engine 112 and other components configured for implementing human and non-human identity risk exposure analysis. A user as described herein is understood to include both human and non-human entities capable of interacting with a system, application, or network. This includes individual human users including employees, customers, agents, technicians, as well as non-human users such as computing devices, applications, or automated processes that are configured to access resources and perform actions within a system. Human and non-human users are typically assigned permission levels that govern access levels and authorized activities. Both humans and non-humans (e.g., computing devices, automated systems, software agents, artificial intelligence, machine learning (ML) models, virtual machines, drones, autonomous vehicles, bots, connected devices, web services, application programming interfaces (APIs)) may become compromised and perform or display anomalous behavior to be addressed in order to maintain a secure system. Users may employ a device (e.g., an electronic device) that connects to a network or system to perform one or more operations. Devices include computers, smartphones, servers, routers, and other equipment with computational or networking capabilities. In some embodiments, a human user using a device may innocently perform tasks that are considered by the system to be malicious or harmful. In such situations, the human user may be provided a warning that the performed actions are not allowed. In other embodiments, a human user may maliciously perform tasks that compromise the security of the system. In such situations, the human user's access may be downgraded or revoked, shutting off access to sensitive information that the human may be attempting to access with malicious intent In some embodiments, a non-human system such as a server may become infected with programs including malware, ransomware, spyware, or become a victim of hacking. Such infestation may cause the server to perform abnormal functions that are not within the security tolerances of the organization. System 100 is configured to perform risk exposure analysis for both human and non-human users in real time and perform responsive tasks (e.g., adjusting access levels) in real time.

System 100 includes computing engine 112, mobile user devices 134 and 136, and a desktop user device 138. Interaction with users or other entities occurs via a website or a native application viewed on a desktop user device 138, a mobile user device 134 or 136, or other components. In some embodiments, interaction occurs via a desktop user device 138 such as a desktop computer, a mobile website viewed on a smart phone, tablet, or other mobile user device 134 or 136, or via a special-purpose native application executing on a smart phone, tablet, or other mobile user device. Providing human and non-human identity risk exposure analysis across a variety of devices is expected to mitigate and reduce damage caused by exposure by proactively identifying risks as they occur in real time.

In some embodiments, computing engine 112 includes one or more of a processor 114, an application program interface (API) server 126, a web server 128, a memory 130, and a cache server 132. These components, in some embodiments, communicate with one another in order to provide the functionality of computing engine 112 described herein.

To illustrate an example of the environment in which computing engine 112 operates, FIG. 1 includes a number of components with which computing engine 112 communicates: mobile user devices 134 and 136; a desktop user device 138; and external resources 146. Each of these devices may communicate with computing engine 112 via a network 150, such as the Internet or the Internet in combination with various other networks, like local area networks, cellular networks, Wi-Fi networks, or personal area networks.

Mobile user devices 134 and 136 comprise smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user devices 134 and 136 stores instructions that when executed by the associated processor provide an operating system and various applications, including a web browser 142, a native mobile application 140, or both. The desktop user device 138 also includes a web browser 144, a native application 145, or other electronic resources. In addition, desktop user device 138 includes a monitor; a keyboard; a mouse; memory; a processor; and a tangible, non-transitory, machine-readable memory storing instructions that when executed by the processor provide an operating system and the web browser 144 or the native application 145.

Native applications 140 and 145, and web browsers 142 and 144, in some embodiments, are operative to provide a graphical user interface associated with a user, for example, which communicates with computing engine 112 and facilitates user interaction with data from computing engine 112. In some embodiments, computing engine 112 is stored on or otherwise executed by user computing resources (e.g., a user computer, server, etc., such as mobile user devices 134 and 136, and desktop user device 138 associated with a user), servers external to the user, or in other locations. In some embodiments, computing engine 112 is run as an application (e.g., an app such as native application 140) on a server, a user computer, or other devices.

External resources 146 include sources of information such as databases, websites, etc.; external entities participating with system 100; one or more servers outside of system 100; a network (e.g., the internet); electronic storage; equipment related to Wi-Fi™ technology; equipment related to Bluetooth® technology; data entry devices; or other resources. External resources 146 include available data sources 148. Available data sources 148 are those available to system 100 for provisioning access or entitlements to resources. Available data sources 148 are heterogeneous, or not the same. Available data sources 148 comprise a large and varying set of data sources, with many different characteristics. Some or all of the available data sources 148 have at least one of different storage architectures or different query languages. In some embodiments, available data sources 148 comprise a data estate of a user with databases 151 (which themselves comprise storage technologies of various types—e.g., tabular data, graph data, embedding vectors, etc.—the approach is not restricted to just tabular data, such as Kusto tables), data tables 152, columns of data 154, documents, charts, images, video, sensor data, customer information, or other data.

For example, available data sources 148 with different storage architectures comprise different types of data repositories or systems that store information in various formats, structures, or modalities. In some embodiments, data sources 148 comprise individual databases 151, data tables 152, columns of data 154, documents, charts, images, video, sensor data, etc. These data sources are not uniform and differ in terms of data format, data models, data structure, storage architecture, access protocols, content type, etc. For example, some available data sources 148 have structured data (like databases or spreadsheets with defined rows and columns), while others have unstructured data (like text documents, images, videos, or social media posts). Different databases or systems use different data models. For example, one source might use a relational database (SQL), while another might use a NoSQL database, a graph database, or flat files. Data in some available data sources 148 is organized hierarchically (like XML or JSON), in tabular format (like in databases), or in less structured formats (like plain text or logs). Available data sources 148 comprise various physical systems like servers, cloud storage, distributed file systems, or third-party application programming interfaces (APIs). Accessing data from different available data sources 148 might involve various protocols, such as REST APIs, SQL queries, or web scraping techniques. Data can also differ in the type of content represented, such as numeric data (financial transactions), textual data (documents), multimedia (images, audio, video), or sensory data (from IoT devices), as examples.

Examples of (heterogeneous) available data sources 148 with different storage architectures include data tables 152; columns of data 154; documents; charts; images; video; sensor data; databases 151 such as relational databases; databases with structured data; databases with unstructured or semi-structured data; file systems (for files like PDFs or logs); APIs; web pages; scraped content; document, image, video, audio, or sensor data archives; etc.

In some embodiments, available data sources 148 include heterogeneous available cybersecurity data sources, as an example. Cybersecurity data can come from an especially wide range of different sources, with an especially wide range of storage architectures, query languages, or other characteristics, making system 100 useful for users making cybersecurity related input queries. Cybersecurity data comprises information collected, generated, or used to monitor, protect, detect, and respond to threats in digital systems, networks, and devices. Cybersecurity data is used for identifying security risks, analyzing potential vulnerabilities, and defending against cyberattacks. Cybersecurity data is typically collected from various sources, including networks, endpoints, servers, applications, and users. Cybersecurity data includes log data, network traffic data, threat intelligence data, vulnerability data, incident data, user behavior data, malware data, security configuration data, access control data, alert data, or other data. Log data includes records of activities on systems, networks, applications, and devices (e.g., firewall logs, web server logs, authentication logs, and system event logs). Network traffic data is data that describes the flow of information across a network (e.g., packet captures, network flows, IP addresses, port usage, etc.). Threat intelligence data includes data about known threats, including malware, phishing attacks, vulnerabilities, and attacker techniques (e.g., lists of known malicious IP addresses or domains, malware signatures, vulnerability databases (CVE), and indicators of compromise (IOCs), etc.) Vulnerability data comprises information about weaknesses or flaws in software, hardware, or network configurations that could be exploited by attackers (e.g., software versioning information, patch management reports, vulnerability assessment results, etc.). Incident data comprises data generated during or after a cybersecurity incident (e.g., incident reports, forensic data, attack timelines, affected systems, etc.). User behavior data comprises data that tracks user activities on systems and networks (e.g., log in times, access patterns, file downloads, email activity, etc.) as well as user activities on devices (e.g., mobile user devices 134, desktop user device 138). Malware data comprises data related to malware (viruses, trojans, ransomware, etc.), used to identify and defend against malicious software (e.g., malware samples, file hashes, behavioral analysis of malware execution, etc.). Security configuration data comprises information about how systems, networks, and applications are configured in terms of security settings (e.g., firewall rules, access control settings, encryption protocols, password policies, etc.). Access control data comprises data that tracks what individuals have access to specific systems, files, and applications (e.g., user roles, access logs, authentication attempts, multi-factor authentication (MFA) data, etc.). Alert data comprises automated alerts or notifications generated by security systems when suspicious or malicious activity is detected (e.g., alerts from intrusion detection/prevention systems (IDS/IPS), antivirus software, or security information and event management (SIEM) systems, etc.).

In some embodiments, (other or non-cybersecurity) available data sources 148 include heterogeneous geospatial data sources (e.g., with data related to the location and features of the earth's surface such as global positioning system (GPS) coordinates, satellite imagery, geographic maps, real-time traffic data, etc.), educational data sources (e.g., with statistics related educators and academic institutions, course materials, etc.), social media data sources (e.g., with data generated from social networks and online platforms), manufacturing and industrial data sources (e.g., with data collected from production processes, machinery, and industrial operations, etc.), environmental data sources (e.g., storing data related to weather patterns, pollution levels, wildlife tracking, climate change models, etc.), transportation and logistics data sources (e.g., with fleet management data, delivery tracking data, public transit schedules, traffic data, etc.), energy and utilities data sources (e.g., with data related to energy production, consumption, and distribution), marketing and advertising data sources (e.g., ad performance data, customer demographics, website traffic analytics, consumer surveys, etc.), telecommunications data sources (e.g., with call logs, internet bandwidth usage, mobile data consumption, text message data, etc.), legal and compliance data sources (e.g., with data related to laws, regulations, compliance monitoring, etc.), agricultural data sources (e.g., with crop yields, soil moisture levels, pest control data, weather impact on agriculture, etc.), sports and fitness data sources (e.g., with player statistics, fitness tracker data, game results, training metrics, etc.), entertainment and media data sources (e.g., with movie ticket sales, streaming platform metrics, music playlists, viewer ratings, etc.), healthcare data sources (e.g., data related to patient access, distribution of healthcare resources, treatment success rates, etc.), financial data sources (e.g., data related to financial transactions, stock market activity, banking, accounting, etc.), retail and E-commerce data sources (e.g., data generated from retail sales, customer preferences, online shopping behavior, etc.), or other available data sources 148.

Even though only a small number of available data sources 148 are shown in FIG. 1A, these are intended to represent tens, hundreds, thousands, millions, or billions of different available data sources 148. In some embodiments, some or all of the different available data sources 148 are co-located (e.g., in a database server associated with a user), or individual available data sources 148 are located remotely from other data sources 148 (e.g., in different database servers associated with an organization and located across the world).

In some embodiments, some or all of the functionality attributed to external resources 146 is provided by resources included in system 100. External resources 146 are configured to communicate with computing engine 112, mobile user devices 134 and 136, desktop user device 138, or other components of system 100 via wired or wireless connections, via network 150 (e.g., a local area network and/or the internet), via cellular technology, via Wi-Fi technology, or via other resources.

Thus, computing engine 112, in some embodiments, operates in the illustrated environment by communicating with a number of different devices and transmitting instructions to various devices to communicate with one another. The number of illustrated external resources 146, desktop user devices 138, and mobile user devices 136 and 134 is selected for explanatory purposes only, and embodiments are not limited to the specific number of any such devices illustrated by FIG. 1, which is not to imply that other descriptions are limiting.

Memory 130 stores instructions 160 that, when executed by processor 114, cause processor 114 to execute the various operations described herein. In some embodiments, memory 130 stores or is configured to access other data required for dynamic agent-based searching over heterogeneous data sources, or other information that otherwise allows system 100 to function as described herein. In some embodiments, memory 130 includes various types of data stores, including relational or non-relational databases; image, document, etc., collections; or programming instructions related to storage and execution of a related multimodal model (large language models, generative models, etc.) for example. In some embodiments, such components are formed in a single database, or are stored in separate data structures. In some embodiments, memory 130 comprises electronic storage media that electronically stores information. In some embodiments, the electronic storage media of memory 130 includes one or both of system storage that is provided integrally (i.e., substantially non-removable) with system 100 or other storage that is connectable (wirelessly or via a wired connection) to system 100 via, for example, a port, a drive, a network (e.g., the Internet), etc. In some embodiments, memory 130 is (in whole or in part) a separate component within system 100, or memory 130 is provided (in whole or in part) integrally with one or more other components of system 100 (e.g., processor 114). In some embodiments, memory 130 is located in a data center, in a server that is part of external resources 146, in a computing device 134, 136, or 138, or in other locations. In some embodiments, memory 130 includes one or more of optically readable storage media, magnetically readable storage media, electrical charge-based storage media (e.g., EPROM, RAM, etc.), solid-state storage media, or other electronically readable storage media. In some embodiments, memory 130 stores software algorithms, information determined by processor 114, information received (e.g., a user input query) via a graphical user interface displayed on computing devices 134, 136, or 138, information received from external resources 146 (e.g., data from a search of an available data source 148), or other information accessed by system 100 to function as described herein.

Processor 114 is configured to coordinate the operation of the other components of computing engine 112 to provide the functionality described herein. In some embodiments, processor 114 is formed by two or more processors, for example. As shown in FIG. 1, in some embodiments, instructions 160 comprise a representation module 116, an intent module 118, a task module 120, a search module 122 (which in turn comprises search agents 123), and an output module 124. Processor 114 is configured to direct the operation of modules 116, 118, 120, 122, or 124 by software; hardware; firmware; some combination of software, hardware, or firmware; machine-readable instructions; or other mechanisms for configuring processing capabilities.

Figure 2:
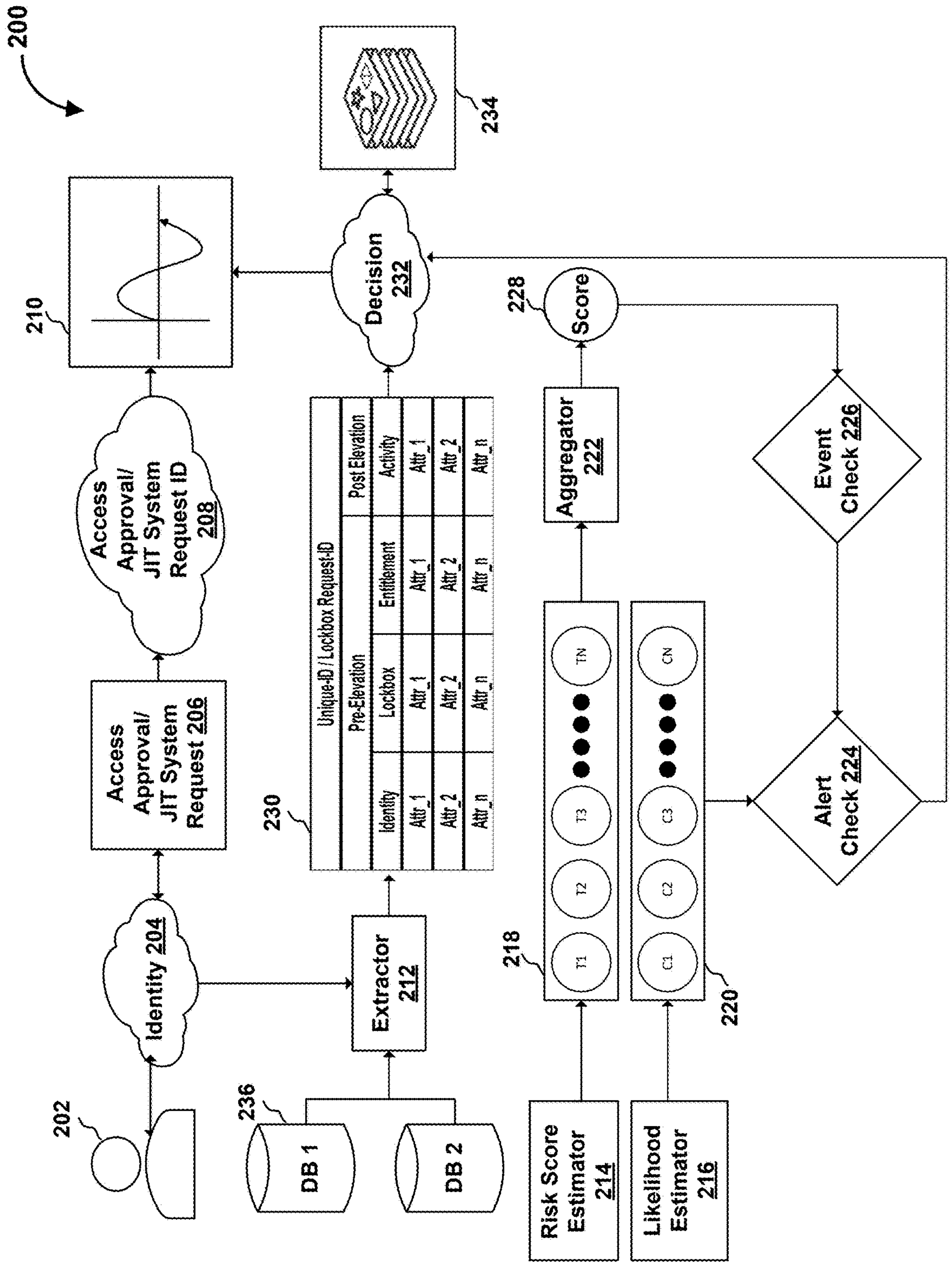
FIG. 2 is an example flow diagram that outlines steps that may be performed when performing human and non-human identity risk exposure analyses.

FIG. 2 is a block diagram of an anomaly detection system 200 that may be implemented in conjunction with the distributed computing system 100 of FIG. 1, according to various embodiments of the present disclosure. As shown, the user 202 provides its user identification to computing service 204. Computing service 204 may be a computing device (e.g., 102, FIG. 1), user device (e.g., 138, FIG. 1), or other electronic device configured to access a network. After the user's identity has been verified, the computing system receives a request 206 (e.g., access approval request, JIT system request, identity and access management system request) for elevated access to a resource. The user 202 may have submitted a request for elevated access to a resource. The data extractor 212 is used to pull data (e.g., profile data, usage data, historical data) from databases 236 (e.g., tenant logs, detection systems) and generates a pre- and post-elevation table 230 comparing the user identity and the request for access to a resource. The term elevation refers to the act of increasing an access level to a resource. The pre- and post-elevation table is generated in part by a calculated risk score estimator 214 and a likelihood estimator 216. A risk score is a numerical representation of the level of risk associated with a user based on various factors and behaviors. The risk score helps the methods and systems described herein to gauge the likelihood of a security threat or vulnerability. Higher scores indicate a greater level of potential risk, while lower scores suggest trustworthiness. In some embodiments, other calculated risk scores are combined with the risk score estimator and likelihood estimator. A likelihood estimator is a statistical tool used to determine the probability of a particular event or outcome occurring. The likelihood estimator is calculated and coupled with the risk score to assess the chance that a specific threat or vulnerability will come to fruition. For example, risk scores 218 may include one or more calculations of severity scores including: entitlement usage frequency score, anomalous access approval request score, JIT system request score, identity and access management system request score, resource risk score, unsuccessful elevation history score, dormancy risk score, concurrent active elevation score, approval score, intensity of operations performed score, anomalous peer group deviation score, data exfiltration score, number of active sessions score, and infrastructure scale score as well as the respective and likelihood estimators (also known as confidence scores associated with each of the above mentioned severity scores). The aggregated amount (e.g., 218 and 220) between the risk score estimator and likelihood estimator becomes the power score 228 (e.g., aggregated risk score) that is used to determine whether the risk of elevation is high or low. Based at least in part on the calculations of the risk score, the alert and event checks 224 and 226 (see table in FIG. 3A), a decision 232 is made whether to approve or reject the request for elevation. If the determination is to approve the elevation, the user's access level is adjusted accordingly 210. Decision 232 may be stored in a cache 234 (e.g., REDIS cache) for storage and ease of access. The activity by the user 202 continues to be monitored and anomalous behavior may change the risk score.

Various data attributes are used to determine whether to elevate a request including the identity of the user, whether the identity is human or non-human, the peer group ID, role (e.g., job title such as system administrator), resource type, and elevation channel (e.g., the medium through which the identity accesses the resources. Further data attributes such as the location where the request was raised, the time at which the request was initiated, the time at which the request was approved, the time when the identity is granted access to specific resources, the time when the identity loses access to specific resources, the historic number of elevation requests made for that resource, the number of times the approver (e.g., second user, manager, supervisor) has rejected the request, the historical number of anomaly triggers that were flagged, the historical number of times the identity has used more than one elevation at the same time. Other data attributes include the privilege level granted to the identity (e.g., entitlement), the number of entitlements owned by the identity, the usage of the entitlement for the specific resource in the past (e.g., past week), the number of dormant entitlements owned by the identity, the number of entitlements that are close to becoming dormant, and the number of times the identity uses a dormant entitlement.

Additionally, data attributes such as the duration during which an activity was recognized (e.g., normal vs abnormal), the number of operations performed by the identity (e.g., the number of tasks accomplished), the total amount of data that was downloaded while performing the operations, the total amount of data that was uploaded while performing the operations, the total number of active concurrent elevations made by the entity, and the number of resources that are concurrently being accessed by the identity.

These data attributes may be used in calculating one or more of the scores described herein. It is understood that the risk score calculations may differ for humans and non-human identities/users.

Pre-Elevation Entitlement Usage Risk Score

The pre-elevation entitlement usage score determines how frequently the identity accesses the resource at the privilege level.

$$\text{Risk Score} = w_1 \times \left(1 - \frac{Param\ 1}{Param\ 0}\right) + w_2 \times f(\text{Today} - Param\ 2) + w_3 \times g(Param\ 3)$$

f(Today—Param 2):

| | <10 d | >10 d + <20 d | >20 d + <30 d |
|---|---|---|---|
| (Today - Param 2) | 0.25 | 0.5 | 0.75 |

$$\text{Hash Key} = \text{Resource} + \text{Entitlement} + \text{Privilege Level}$$

$$\text{Resource} = \text{Workload} + \text{Subscription Name} + \text{Subscription } Env + \text{Tenant Name}$$

Param 0—Total records found for the user—#(Entitlement)
Param 1—#Hash Key
Param 2—Last Accessed (Hash Key)
Param 3—Frequency of Hash Key)
Anomalous User & Resource Activity Score

```
If request_location != base_location:
   location_score = 100
If request_time or de-elevation_time not in working_hours:
   time_score = 100
Risk Score = max (location score, time_score)
```

Resource Risk Score

PrivilegeLevel: High (15), Medium (8), Low (4)
IsProxyScriptVialPW: true (−10), false (0)
IsOnBehalfOfRequest: true (10), false (0)
IsFederatedForApproval: true (−10), false (0)
NoOfSubscriptions: 1 (5), 2-5 (10), >5 (15)
SubscriptionEnv: Production (20), Non-Production (10)
ScaleUnit: Global (20), Core (10), ServiceAuth (5)
Role: ATCD (20), CustomerPIIAccess (20), AzureSubscriptionAdminAccess (20), Admin (10), Others (0)

$$\text{Resource} - \text{Risk} = \text{Sum } (1 + 2 + 3 + 4 + 5 + 6 + 7)$$

Lateral Movement:

| Tenant | Environment 1 | Environment 2 | Environment 3 | Environment 4 |
|---|---|---|---|---|
| Risk Score | 90 | 75 | 60 | 40 |

$$\text{Risk Score} = \text{Average of Resource Risk} + \text{Lateral Movement}$$

Unsuccessful Elevation Attempts Score

If Previously Denied:

$$\text{Risk Score} = \left(2 \times \frac{\text{Failed Requests}}{\text{Total Elevations}}\right) + \left(\frac{\text{Failed Elevations}}{\text{Total Elevations}}\right)$$

If Previously Failed:

$$\text{Risk Score} = \left(\frac{\text{Failed Requests}}{\text{Total Elevations}}\right) + \left(2 \times \frac{\text{Failed Elevations}}{\text{Total Elevations}}\right)$$

Else:

$$\text{Risk Score} = \left(\frac{\text{Failed Requests}}{\text{Total Elevations}}\right) + \left(\frac{\text{Failed Elevations}}{\text{Total Elevations}}\right)$$

Dormancy Risk

If Role is Dormant:

$$\text{Risk Score} = \sqrt[3]{\frac{\#\text{ Dormant Entitlements}}{\#\text{ Total Entitlements}}} + \sqrt{\frac{\#\text{ Near Dormant Entitlements}}{\#\text{ Total Entitlements}}}$$

If Role is Near-Dormancy:

$$\text{Risk Score} = \sqrt[2]{\frac{\#\text{ Dormant Entitlements}}{\#\text{ Total Entitlements}}} + \sqrt[3]{\frac{\#\text{ Near Dormant Entitlements}}{\#\text{ Total Entitlements}}}$$

Else:

$$\text{Risk Score} = \frac{\#\text{ Dormant Entitlements} + \#\text{ Near Dormant Entitlements}}{\#\text{ Total Entitlements}}$$

Concurrency Risk Score $$\text{Active Elevation: } 1(0)| > 1 \text{ and } < 3(25)| >= 3(50)$$

| # Active Elevations | 1 | >1 | >=3 |
|---|---|---|---|
| Active Score | 0 | 0.6 | 0.8 |

$$Hist\ \text{Score} = 0.5 \times \tanh(0.5 \times \text{Max Concurrent Elevations})$$

If Active Score != 0 and *Hist* Score != 0:

$$\text{Risk Score} = 0.55 \times \text{Active Score} + 0.45 \times Hist\ \text{Score}$$

If Active Score != 0 and *Hist* Score == 0:

$$\text{Risk Score} = \text{Active Score}$$

If Active Score == 0 and *Hist* Score != 0:

$$\text{Risk Score} = Hist\ \text{Score}$$

Else:

If Active Score != 0 and *Hist* Score != 0:

$$\text{Risk Score} = 0$$

Access Time Risk Score

If identity == Non-Human:

a. $\alpha = 0.5$ b. $\beta = 0.5$ c. $\mu = 15$ d. $\Omega = 5$

If identity == Human:

a. $\alpha = 0.5$ b. $\beta = 0.5$ c. $\mu = 5400$ d. $\Omega = 3600$

TG_1 = Elevation Time − Request Create Time (in seconds)

TG_2 = Approval Time − Request Create Time (in seconds)

$$func(x) = \frac{1}{1 + e^{(6x-2)}}$$

$$\text{Risk Score} = \alpha \cdot func\left(\frac{TG_1}{\mu}\right) + \beta \cdot func\left(\frac{TG_2}{\Omega}\right)$$

Entitlement Usage Risk Score

Volume of Activity = # Operations Performed × Activity Duration Deviation < 10% − Low

| Entitlement | Kusto Data | Prodn. Resources | NPE |
|---|---|---|---|
| Monitoring | 45 | 55 | 30 |
| Testing | 65 | 75 | 50 |
| Delete Prod. Nodes | 85 | 95 | 70 |

Deviation > 10% & < 35% − Medium

| Entitlement | Kusto Data | Prodn. Resources | NPE |
|---|---|---|---|
| Monitoring | 47 | 57 | 32 |
| Testing | 67 | 77 | 52 |
| Delete Prod. Nodes | 87 | 97 | 72 |

Deviation > 35% − High

| Entitlement | Kusto Data | Prodn. Resources | NPE |
|---|---|---|---|
| Monitoring | 50 | 60 | 35 |
| Testing | 70 | 80 | 55 |
| Delete Prod. Nodes | 90 | 100 | 75 |

Impact Score

| Deviation Threshold | Human | Non-Human |
|---|---|---|
| Low | 25 | 15 |
| Medium | 50 | 50 |
| High | 75 | 90 |

$$\text{Risk Score} = \frac{\text{Likelihood Score} * \text{Impact Score}}{100}$$

Anomalous Peer Group Activity

Volume of Activity = # Operations Performed × Activity Duration

Mean, *Std* = Peer Group *Stats* (Peer Group *ID*)

Criticality Factor

| Entitlement | Kusto Data | Prodn. Resources | NPE |
|---|---|---|---|
| Monitoring | 0.47 | 0.57 | 0.32 |
| Testing | 0.67 | 0.77 | 0.52 |
| Delete Prod. Nodes | 0.87 | 0.97 | 0.72 |

Data Exfiltration Attempts Score a. If Prior History Not Found: Mean Act.=Pre-Defined Threshold $$\text{Risk Score}_{Download} = \left[\frac{(\text{Current } Act. - \text{Mean } Act.)}{\text{Mean } Act.}\right] * 100$$

$$\text{Risk Score}_{Upload} = \left[\frac{(\text{Current } Act. - \text{Mean } Act.)}{\text{Mean } Act.}\right] * 100$$

$$\text{Risk Score}_{Overall} = \text{Mean }(\text{Risk Score}_{Download} + \text{Risk Score}_{Upload})$$

Privilege Utilization Score a. Usage of Elevated Privileges (UEP)

$$UEP = \frac{\text{Number of Operations with Elevated Privileges}}{\text{Typical Number of Operations with Elevated Privileges}}$$

b. Duration of Elevated Privileges (DEP)

$$DEP = \frac{\text{Time with Elevated Privileges}}{\text{Typical Active Time with Elevated Privileges}}$$

c.

$$\text{Risk Score } (RS) = 50 \times (1 + \tanh(\alpha \cdot UEP + \beta \cdot DEP))$$

Number of RDP Sessions Score a. Definition: Risks associated with the number of RDP sessions which could be exposed/compromised b. R—The number of RDP sessions that are currently running c. T—Threshold for the number of RDP sessions that we consider to be acceptable.

d. If R<T, then Risk Score=(R/T)*50
If R>=T, then Risk Score=50+((R−T)/(2*T))*50

Infrastructure Scale Risk Score a. I—Infrastructure Scale-represented by number of servers, systems, applications running b. M—Maximum Manageable Scale-Threshold based on historical data $$RiskScore(RS) = \frac{100}{1 + e^{-(I-M)}}$$

c. As I approaches M, risk score approaches 100 and if I is much less than M, risk score RS is close to 0.

Aggregated Risk Score $$\log its = [T_1, T_2, \ldots, T_{10}]$$

$$Agg.\ RiskScore = \left(\frac{1}{n}\sum_{i=1}^{n} x_i^p\right)^{\frac{1}{p}}$$

a. p=5—assigns higher importance to threat parameters with larger values

Figures 3A, 3B:
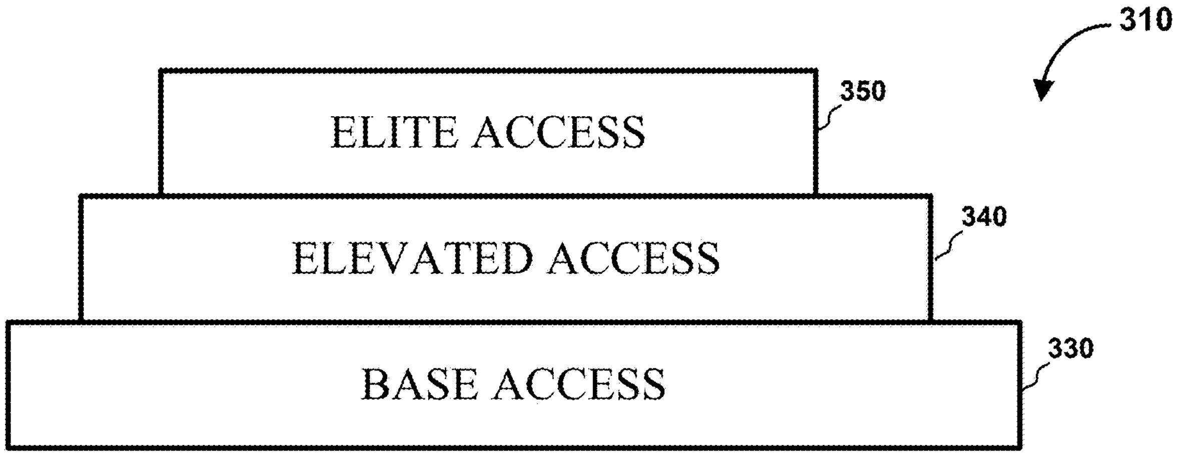
FIG. 3A is an example truth table that may be implemented in conjunction with the distributed computing system of FIG. 1, according to one or more embodiments described within the present disclosure.
FIG. 3B is an example access level diagram that may be implemented in conjunction with the distributed computing system of FIG. 1, according to one or more embodiments described within the present disclosure.

FIG. 3A is an example table 300 used in assessing whether a risk score associated with a user satisfies a threshold. If the risk scores of any of the parameters described herein satisfies a threshold value (e.g., 0.6), the identity risk exposure analysis system determines that threat parameter as being "activated." For example, a score of 0.6 or higher for a certain parameter is determined to be a high risk but a score of 0.59 or lower for certain parameters are determined to be a low risk. If the system determines one or more threat parameters as being "activated," meaning the threshold is satisfied by a value associated as being high risk, the risk detection pipeline triggers an "event." These events are occurrences that are created based on a high-risk score activating one or more threat parameters. An event includes a confidence score indicating a level of confidence that the system has correctly detected a threat. Events with confidence scores that satisfy a threshold value (e.g., higher than 0.67) are elevated as alerts. FIG. 3A provides a table correlating the risk score, confidence score, and whether an alert is triggered. When an alert is triggered, a severity level is assigned to the alert, ranging from safe, severe, critical, very severe, to very critical. The severity levels may be used in determining whether access is to be granted (i.e., elevated). In some embodiments, a "safe" level determination automatically provides access to the resource with or without explicit approval from a supervisor (e.g., second user). In some embodiments, a "severe" level determination requires explicit approval from a supervisor (e.g., second user), while a "critical" level determination requires explicit approval from a supervisor and is accompanied by a report of the anomalous behaviors corresponding to the risk score. In some embodiments, the "critical" level determinations require a secondary approval (e.g., from a third user who has at least the same or higher access permission as the second user). In some embodiments, a "very severe" level determination requires review from a management team and/or during the review process, the access level is downgraded. In some embodiments, a "very critical" level determination automatically revokes access to the resource.

FIG. 3B is an example access level diagram 310 of a range of access levels available for use within a resource. It is understood that the level of access and numbers of identities associated with the access level is not shown to scale and is for illustration purposes only. Base access level 330 is the lowest level of access and open to the greatest number of identities or users. Base access level 330 may only provide cursory access to resources and access to sensitive information may be blocked. Base access level 330 is the lowest level of access with the most restrictions. For example, all users within an enterprise organization is automatically assigned a base access level 330. The elevated access level 340 is a higher level of access than the base access level and provides more access to the resource. For example, managers, supervisors, and those with senior titles automatically have enhanced access to resources. Elevated access level 340 may provide read and/or write capabilities, access to confidential information, and access to sensitive information. The elite access level 350 is the highest access level. This level has the fewest number of human and non-human users/identities that are provided this level of access. For example, the chief executive officer (CEO) and chief technical officer (CTO) are the only people in the entire organization with elite access 350. There may be other layers of access not shown in FIG. 3B that are appropriate for implementing the disclosure herein.

Figure 4:
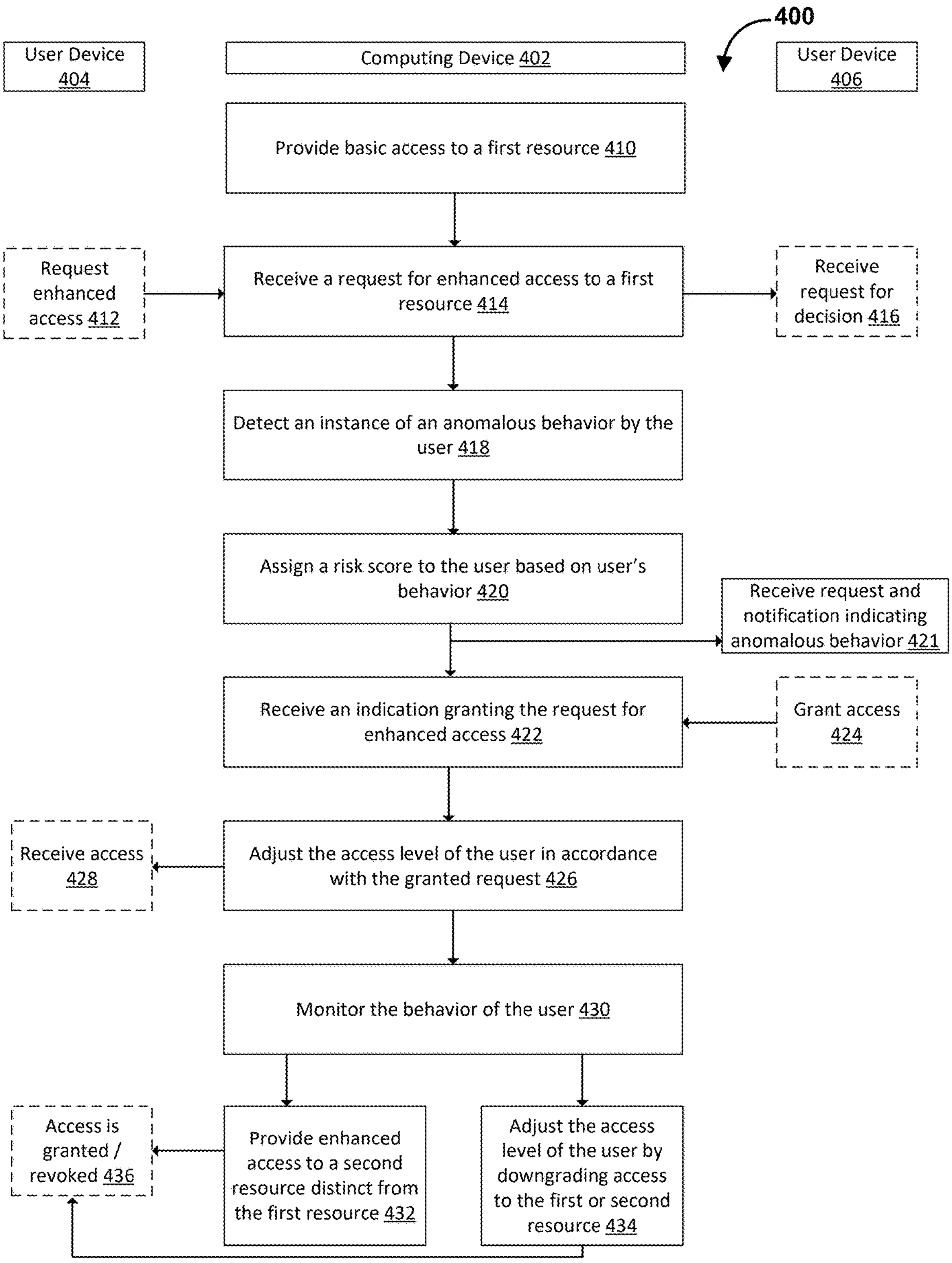
FIG. 4 is an example flow diagram of method steps for conducting a human and non-human identity risk exposure analysis within a distributed computing system, according to one or more embodiments described within the present disclosure.

FIG. 4 is a flow diagram of method steps 400 for performing risk exposure analysis across one or more components within a distributed computing system, according to one or more embodiments of the present disclosure. Although the method steps are described in conjunction with the systems of FIGS. 1-3, persons of ordinary skill in the art will understand that any system configured to perform the method steps, in any order, is within the scope of the present disclosure.

As shown, a method 400 begins at step 410, where a computing device 402 (e.g., computing device 112, FIG. 1) provides a basic access to a first resource (e.g., a software tool). For example, a user (e.g., user 202, FIG. 2) operating a user device 402 (e.g., user device 134, FIG. 1) may have never accessed a first resource. However, the user may have basic access to a set of resources (e.g., a suite of software tools) including the first resource. The computing device would permit the user to access the first resource at a basic level (e.g., the user does not have access to settings, confidential information, write capabilities). In some embodiments, the user may receive automatic access at a basic level to one or more resources. In some embodiments, the user may receive access to one or more resources from a second user (e.g., a supervisor or manager). In some embodiments, the computing device monitors and logs the user's activity prior to providing any access to the first resource.

Method 400 continues at step 414 when computing device 414 receives, from user device 404, a request for elevated access to a resource. In some embodiments, the request for elevated access is for access to multiple resources. In some embodiments, the request for elevated access is for additional access to a resource. For example, a user is provided basic access to Resource "Payroll" but is not able to access confidential information including social security numbers, bank accounts, and salary information. The user would like access to social security numbers and salary information and submits a request for elevated access to "Payroll" which would allow her visibility into confidential information that she is not able to access at the basic access level.

Step 416 of method 400 includes receiving, by the user device 406 (e.g., second user device), a request for a decision to grant or deny a request for elevated access. In some embodiments, the second user receives an analysis of the behaviors (non-anomalous or anomalous) of the first user to provide context into whether access should be granted or denied.

Method 400 continues at step 418 when the computing device 402 detects an instance of an anomalous behavior by the first user. The computing device may be consistently monitoring the activities of the user within the first resource to determine whether the user is a conducting risky activities. In some embodiments, the computing device may review a log of activity conducted by the first user that was previously stored.

There are several actions, behaviors, or patterns that may constitute anomalous behavior. Identifying and managing such actions, behaviors, or patterns allows the organization to take proactive measures to mitigate them as such anomalous behaviors may signal vulnerabilities that may harm the organization. Seemingly innocuous behaviors may be considered anomalous within certain contexts. For example, such anomalous behaviors also known as risky behaviors that a human or non-human entity is participating in pre-elevation may include but is not limited to: a) the frequency in which a user (or identity) requests elevation of access to a resource using a specific privilege level, 2) whether the request arises during the user (or identity's) normal working hours and base location, 3) the kind of subscriptions and number of subscriptions that the user or identity is attempting to access, 4) whether the user/identity is requesting access to sensitive information (e.g., customer data), 5) the frequency in which the user/identity was granted or denied access to other resources, 6), whether there is a possibility of lateral movement using a high privileged non-human identity (e.g., titles such as service principal or service account), 7) the frequency in which the user or identity's just-in-time elevation failed, 8) the state of the user's entitlements (e.g., dormant, active, approaching dormancy), 9) the number of active elevations that the user/identity currently supports, and 10) the frequency in which the user/identity raises concurrent elevations. The computing device may consider any or all of the above identified pre-elevation risks when determining the risk score and whether to grant or deny access to a resource.

Based at least in part on the user's behavior, method 400 continues with step 420, where the computing device assigns a risk score to the user. In some embodiments, the user's risk score is regularly updated based on anomalous and non-anomalous behaviors taken by the user. For example, a user's risk score may spike based on activities that appear to be anomalous. However, the user's risk score may decrease over time if anomalous activities are not detected thereafter. A high-risk score associated with a user may prevent the user from receiving or obtaining higher access privileges to requested resources. Similarly, a high-risk score associated with the user may cause the user to lose access to resources, have fewer privileges, or be locked out of the resource entirely. The calculation of the user's risk score is discussed in further detail with respect to FIG. 2. In some embodiments, the computing device 406 receives, from computing device 402, the request from computing device 404 and a notification indicating anomalous behavior.

In some embodiments, the computing device reviews the anomalous activity and calculates a risk score. In some embodiments, if the risk-score of any of the threat-parameters is above a pre-defined threshold (e.g., 0.6), the computing device considers the threat-parameter to be activated. As described above with respect to FIG. 3A, If the risk score is calculated to be one or more than one, but less than all of the threat-parameters are activated, the scenario is defined as a Partial-Path Trigger. If the risk score is calculated to be one or more than one, and all threat-parameters are activated, the scenario is defined as a Full-Path Trigger. In any case, if either the partial-path or full-paths are triggered, alerts are generated and communicated to responsible teams or service owners that are notified to evaluate whether the triggers have been caused by known users or identities or whether bad actors are attempting to perform malicious activities.

Method 400 continues at step 422, where the computing device 402 receives from a user device 406 (e.g., a second user), an indication granting the elevated access request for the first user. In some embodiments, the computing device 404 provides the user device 406 with an explanation of the first user's anomalous behavior. The explanation of the behavior may include details such as: the user's employment information, title, supervisor, the type of tool being used, the time at which the anomalous behavior was recorded, the length of time spent performing said anomalous behavior, IP address, location of the device, user login information, and other details that provide context surrounding the flagged anomalous behavior. The explanation of the behavior may be communicated in a notification to alert administrators or supervisors about the user's anomalous behavior or other security risks. The notifications are triggered by the user's anomalous behavior and sent to supervisory authorities for review. For example, the second user device (e.g., 406, the supervisor's device), receives a notification (e.g., via email, SMS text message, in application alert, popup, flag, ticket, push notification on mobile devices) that the first user is requesting elevated access to a tool and a notification that the user requesting the elevated access has been displaying anomalous behavior (e.g., erratic clicking, multiple elevation requests at the same time, elevation requests outside of the normal working hours of the user). Based on the notification and provided context regarding the anomalous behavior, the second user is able to make an informed decision of whether to grant or deny elevated access. The final determination of whether to grant or deny elevated access to the first user is left to the second user's discretion. In some embodiments, the second user is notified of the elevated access request, any anomalous behavior by the first user, and a notice that access will not be granted. In some embodiments, the second user is notified of the elevated access request, any anomalous behavior by the first user, and a notice that access will be granted. In some embodiments, the second user may override the automated decision by granting access or denying access. In some embodiments, the risk score may determine that the user is granted a lower-level access than requested, but higher than what the user is presently entitled to. In some embodiments, the risk score of the user may determine that the user is granted the requested elevated access for a set duration, and after the duration runs out, the access level is reverted back to what the user had previously been entitled to.

Method 400 continues after the computing device 402 receives, at step 424, the indication granting the request for the first user device 404 to have elevated access to the resource. Step 426 is conducted by the computing device 402 to adjust the access level of the user in accordance with the granted request. In some embodiments the adjustment of access level is time-bound. In some embodiments, the adjustment of access level is static until a new threshold event occurs (e.g., a new request for elevated access, risk score satisfying a threshold). User device 404 receives elevated access to the resource at step 428.

After the user of computing device 404 receives elevated access to the resource, computing device 402 monitors the behavior of the user at step 430. In some embodiments, the computing device 402 compares the behavior of the first user before the grant of elevated access to the behavior of the user after the granting of elevated access to determine whether the user will continue to enjoy the elevated access. In some embodiments, the computing device 402 monitors the behavior of the user for a set duration of time. If further anomalous activities are detected, the first user may receive a notice to refrain from conducting such behaviors. In some embodiments, the user is not notified and may be downgraded access levels. In some embodiments, the user is not notified and access to the resource is revoked.

For example, risky behaviors that a human or non-human entity is participating in post-elevation (after receiving elevated access) may include but is not limited to: a) the immediacy in which the user/identity began accessing the resource after receiving the granted access, b) the time delta in which the request was received and the approval was granted, c) whether the volume of operations performed by the user/identity deviates from historical records, d) whether the volume of operations performed by the user/identity deviates from peer-group statistics, c) whether there are unusual patterns with network activity, f) the medium through which the user/identity is enjoying the elevated access by assuming the credentials of a non-human identity (e.g., service principal or service account), and g) the size of the infrastructure that the user/identity is accessing. The computing device may consider any or all of the above identified post-elevation risks when determining the risk score and whether to maintain the granted higher access level, cease provision of the higher access level, flag as a concern for a supervisory review, or deny/revoke access.

Method 400 further includes step 432 where the computing device may provide elevated access to a second resource distinct from the first resource. For example, the user is granted elevated access to tool A and maintains the access level for three days without any anomalous behaviors being detected. Based on the risk score and lack of anomalous behavior, the computing device may provide the user with elevated access to tool B. In some embodiments, the second user (e.g., manager) is notified that elevated access will be provided without requiring further confirmation or feedback from the second user. In some embodiments, the user is notified of the granted elevated access to the second resource. In some embodiments, the user is not notified of the granted elevated access but is able to use the second resource at the elevated access level.

In some embodiments, method 400 includes step 434 where the computing device may adjust the access level of the user by downgrading access to the first or second resource, or both resources. For example, the user has an elevated access level to the first resource and a second resource. Based at least in part on the monitored anomalous behavior and the risk score, the user may be downgraded from enjoying the elevated access level of either the first or second or both resources. In some embodiments, the user is performing anomalous behaviors while accessing the first resource. In response, the computing system 404 downgrades the user's access to the second resource. In some embodiments, the computing system 404 may maintain the user's access level to the first resource but downgrade access to the second resource. At step 436, the user's access level is either granted, downgraded, or revoked entirely.

Figure 5:
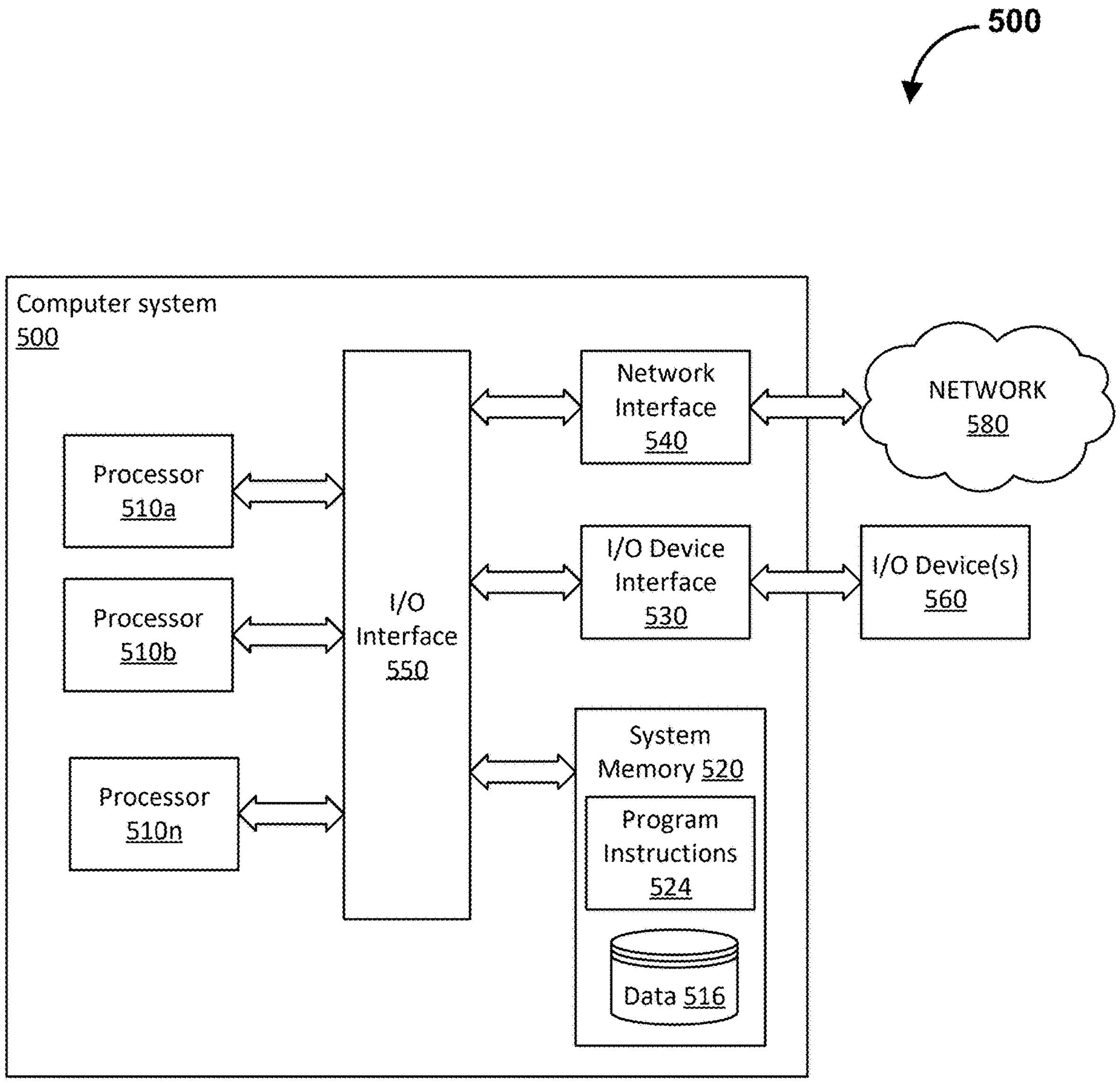
FIG. 5 illustrates a network infrastructure that may be used to implement the distributed computing system of FIG. 1, according to various embodiments of the disclosure.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an input/output I/O device interface 550, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that conducts program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a unit-processor system including one processor (e.g., processor 510*a*), or a multi-processor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 550 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a liquid crystal display (LCD) monitor), pointing devices (e.g., a computer mouse), keyboards, keypads, touchpads, scanning devices, voice recognition devices, gesture recognition devices, printers, audio speakers, microphones, cameras, or the like. I/O devices 560 may be connected to computing system 500 through a wired or wireless connection. I/O devices 560 may be connected to computing system 500 from a remote location. I/O devices 560 located on remote computer system, for example, may be connected to computing system 500 via a network and network interface 540.

Network interface 540 may include a network adapter that provides for connection of computing system 500 to a network. Network interface 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 524 or data 516. Program instructions 524 may be executable by a processor (e.g., one or more of processors 510*a*-510*n*) to implement one or more embodiments of the present techniques. Instructions 524 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory computer readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computer systems 500 configured to host different portions or instances of embodiments. Multiple computer systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium." In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several embodiments. Rather than separating those embodiments into multiple isolated patent applications, applicants have grouped these embodiments into a single document because their related subject matter lends itself to economies in the application process. But the distinct advantages and aspects of these embodiments should not be conflated. In some cases, embodiments address all of the deficiencies noted herein, but it should be understood that the embodiments are independently useful, and some embodiments address only a subset of such problems or offer other, unmentioned benefits that will be apparent to those of skill in the art reviewing the present disclosure. Due to cost constraints, some disclosed embodiments are not presently claimed and may be claimed in later filings, such as continuation applications or by amending the present claims. Similarly, due to space constraints, neither the Abstract nor the Summary sections of the present document should be taken as containing a comprehensive listing of all such embodiments or all aspects of such embodiments.

It should be understood that the description and the drawings are not intended to limit an embodiment to the particular form disclosed, but to the contrary, the intention is to cover all modifications, equivalents, and alternatives falling within the spirit and scope of the present embodiments as defined by the appended claims. Further modifications and alternative embodiments will be apparent to those skilled in the art in view of this description. Accordingly, this description and the drawings are to be construed as illustrative only and are for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both or all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, comprising: receiving, by a processor, from a device of a first user, a request for elevated access to a resource; detecting, by the processor, an instance of an anomalous behavior caused by the first user; based at least in part on the anomalous behavior, assigning, by the processor, a risk score to the first user; providing, by the processor, to a device of a second user, the received request for elevated access to the resource, and a notification indicating the instance of the anomalous behavior; receiving, by the processor, an indication granting the request for elevated access to the resource; and adjusting, by the processor, an access level of the first user to the resource in accordance with the granted request.
2. The method of embodiment 1, further comprises: determining the risk score of the first user satisfies a threshold; providing, by the processor, to the device of the second user, the received request for elevated access and an alert indicating at least the instance of anomalous behavior.
3. The method of any of the previous embodiments further comprises: receiving, by the processor, from the device of the second user, an indication granting the request for elevated access.
4. The method of any of the previous embodiments, wherein the second user has an access level that is higher than that of the access level of the first user.
5. The method of any of the previous embodiments, wherein assigning the risk score to the user further comprises: generating a risk likelihood score based on one or more historical records associated with the first user; generating a risk confidence score based at least in part on the risk likelihood score; and associating the risk likelihood score and the risk confidence score to the risk score.
6. The method of any of the previous embodiments further comprises: associating the instance of the anomalous behavior in a profile of the first user; and associating the risk score in the profile of the first user.
7. The method of embodiment 1, further comprises: after adjusting the access level of the first user to the resource, monitoring the behavior of the first user; and detecting a second instance of an anomalous behavior caused by the first user; based on at least the second instance, updating the risk score of the first user.
8. The method of any of the previous embodiments further comprises: after updating the risk score of the first user, adjusting the access level of the first user.
9. The method of any of the previous embodiments, further comprising revoking access to the resource.
10. The method of any of the previous embodiments, further comprising: adjusting, by the processor, the access level of the first user to a basic level of access.
11. The method of any of the previous embodiments, further comprising: receiving an indication that the first user is accessing a second resource distinct from the first resource; detecting a second instance of anomalous behavior caused by the first user while accessing the second resource; updating the risk score of the first user based on the detected second instance; and providing, to the device of the second user, an indication that the first user's risk score has changed.
12. The method of any of the previous embodiments, further comprising: receiving, by the processor, an indication to revoke the first user's access to the first resource; and revoking the first user's access to the first resource.
13. The method of any of the previous embodiments, further comprises revoking the first user's access to the second resource.
14. The method of any of the previous embodiments, wherein the first user is a computing device.
15. The method of any of the previous embodiments, wherein the notification indicating the instance of the anomalous behavior includes a report indicating the context of at least the instance of the anomalous behavior caused by the first user, wherein the context includes a location of the device of the first user or an access log of the device of the first user.
16. The method of any of the previous embodiments, wherein the risk score is calculated at least in part on a combination of an entitlement usage score, anomalous user score, resource risk score, unsuccessful elevation attempt score, dormancy risk score, concurrency score, and access time score.
17. The method of any of the previous embodiments, wherein the risk score is updated after the access level is adjusted and recalculated based at least in part on a combination of a post-elevation entitlement usage risk score; anomalous peer group activity score, data exfiltration attempt score, privilege utilization score, session score, and infrastructure scale risk score.
18. The method of any of the previous embodiments, further comprising: after adjusting the access level of the first user: providing, to the device of the first user, an indication that the request for elevated access has been approved.
19. A system, comprising: one or more processors; memory storing one or more programs that are configured to be executed by the one or more processors, the one or more programs including instructions for: receiving, by a processor, from a first user, a request for elevated access to a resource; detecting, by the processor, an instance of an anomalous behavior caused by the first user; based at least in part on the anomalous behavior, assigning, by the processor, a risk score to the first user; in accordance with a determination that the risk score of the user satisfies a threshold: providing, by the processor, to a second user, the received request for elevated access to the resource, and a notification indicating the instance of the anomalous behavior; receiving, by the processor, from the second user, an indication granting the request for elevated access to the resource; adjusting, by the processor, the access level of the first user in accordance with the granted request; and providing, to the device of the first user, an indication that the request for elevated access to the resource has been granted.
20. A non-transitory computer-readable storage medium storing executable instructions that, when executed by an electronic device, cause the electronic device to: receive, from a first user, a request for elevated access to a resource; detect an instance of an anomalous behavior caused by the first user; based at least in part on the anomalous behavior, assign a risk score to the first user; in accordance with a determination that the risk score of the user satisfies a threshold: provide, to a second user, the received request for elevated access to the resource, and a notification indicating the instance of the anomalous behavior; receive from the second user, an indication granting the request for elevated access to the resource; adjust the access level of the first user in accordance with the granted request; and monitor the access of the first user for additional instances of anomalous behavior.

What is claimed is:

1. A method, comprising:

receiving, by a processor, from a device of a first user, a request for elevated access to a resource;

detecting, by the processor, an instance of an anomalous behavior caused by the first user;

based at least in part on the instance of the anomalous behavior, assigning, by the processor, a risk score to the first user;

providing, by the processor, to a device of a second user, the request for elevated access to the resource, and a notification indicating the instance of the anomalous behavior;

receiving, by the processor, an indication granting the request for elevated access to the resource; and adjusting, by the processor, an access level of the first user to the resource in accordance with the request.

2. The method of claim 1, further comprising:

determining the risk score assigned to the first user satisfies a threshold;

providing, by the processor, to the device of the second user, the request for elevated access and an alert indicating at least the instance of the anomalous behavior.

3. The method of claim 1, wherein assigning the risk score to the first user further comprises:

generating a risk likelihood score based on one or more historical records associated with the first user;

generating a risk confidence score based at least in part on the risk likelihood score; and associating the risk likelihood score and the risk confidence score with the risk score.

4. The method of claim 1, further comprising, after adjusting the access level of the first user to the resource:

monitoring the behavior of the first user;

detecting a second instance of the anomalous behavior caused by the first user; and based on at least the second instance of the anomalous behavior, updating the risk score assigned to the first user.

5. The method of claim 4, further comprising, after updating the risk score assigned to the first user, adjusting the access level of the first user.

6. The method of claim 5, further comprising revoking access to the resource.

7. The method of claim 5, further comprising adjusting, by the processor, the access level of the first user to a basic level of access.

8. The method of claim 1, wherein the resource comprises a first resource and the method further comprises:

receiving an indication that the first user is accessing a second resource distinct from the first resource;

detecting a second instance of anomalous behavior caused by the first user while accessing the second resource;

updating the risk score assigned to the first user based on the detection of the second instance of the anomalous behavior; and providing, to the device of the second user, an indication that the risk score assigned to the first user has been updated.

9. The method of claim 8, further comprising:

receiving, by the processor, an indication to revoke the first user's access to the first resource; and revoking the first user's access to the first resource.

10. The method of claim 9, further comprising revoking the first user's access to the second resource.

11. The method of claim 1, wherein the notification indicating the instance of the anomalous behavior includes a report indicating a context of at least the instance of the anomalous behavior caused by the first user, wherein the context includes a location of the device of the first user or an access log of the device of the first user.

12. The method of claim 1, further comprising, after adjusting the access level of the first user, providing, to the device of the first user, an indication that the request for elevated access has been granted.

13. A system, comprising:

one or more processors;

memory storing one or more programs that are configured to be executed by the one or more processors, the one or more programs including instructions for:

receiving, by a processor, from a device of a first user, a request for elevated access to a resource;

detecting, by the processor, an instance of an anomalous behavior caused by the first user;

based at least in part on the instance of the anomalous behavior, assigning, by the processor, a risk score to the first user;

in accordance with a determination that the risk score assigned to the first user satisfies a threshold:

providing, by the processor, to a device of a second user, the request for elevated access to the resource, and a notification indicating the instance of the anomalous behavior;

receiving, by the processor, from the device of the second user, an indication granting the request for elevated access to the resource;

adjusting, by the processor, an access level of the first user to the resource in accordance with the request; and providing, to the device of the first user, an indication that the request for elevated access to the resource has been granted.

14. The system of claim 13, wherein the one or more programs further include instructions for providing, by the processor, to the device of the second user, the request for elevated access and an alert indicating at least the instance of the anomalous behavior.

15. The system of claim 14, wherein the one or more programs further include instructions for, after adjusting the access level of the first user to the resource:

monitoring the behavior of the first user;

detecting a second instance of the anomalous behavior caused by the first user; and based on at least the second instance of the anomalous behavior, updating the risk score assigned to the first user.

16. The system of claim 14, wherein the resource comprises a first resource and the one or more programs further include instructions for:

receiving an indication that the first user is accessing a second resource distinct from the first resource;

detecting a second instance of the anomalous behavior caused by the first user while accessing the second resource;

updating the risk score assigned to the first user based on the detection of the second instance of the anomalous behavior; and providing, to the device of the second user, an indication that the risk score assigned to the first user has been updated.

17. The system of claim 16, wherein the resource comprises a first resource and the one or more programs further include instructions for revoking the first user's access to the second resource.

18. A non-transitory computer-readable storage medium storing executable instructions that, when executed by an electronic device, cause the electronic device to:

receive, from a device of a first user, a request for elevated access to a resource;

detect an instance of an anomalous behavior caused by the first user;

based at least in part on the instance of the anomalous behavior, assign a risk score to the first user;

in accordance with a determination that the risk score assigned to the first user satisfies a threshold:

provide, to a device of a second user, the request for elevated access to the resource, and a notification indicating the instance of the anomalous behavior;

receive from the device of the second user, an indication granting the request for elevated access to the resource;

adjust the access level of the first user to the resource in accordance with the request; and monitor access of the first user to the resource for additional instances of anomalous behavior.

19. The computer-readable storage medium of claim 18, wherein the instructions to assign the risk score to the first user further comprise:

generating a risk likelihood score based on one or more historical records associated with the first user;

generating a risk confidence score based at least in part on the risk likelihood score; and associating the risk likelihood score and the risk confidence score with the risk score.

20. The computer-readable storage medium of claim 18, wherein the notification includes a report indicating a context of at least the instance of the anomalous behavior caused by the first user, wherein the context includes a location of the device of the first user or an access log of the device of the first user.

* * * * *